United States Patent
Yamamoto et al.

(10) Patent No.: US 11,238,671 B2
(45) Date of Patent: Feb. 1, 2022

(54) SYSTEM AND METHOD FOR PROVIDING HAPTIC ALERTS WITHIN A VEHICLE

(71) Applicant: Honda Motor Co., Ltd., Tokyo (JP)

(72) Inventors: Stuart Masakazu Yamamoto, La Mirada, CA (US); Joseph Anthony Alequin, Los Angeles, CA (US); Hartley Ochavillo, Marina Del Rey, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 264 days.

(21) Appl. No.: 16/388,246

(22) Filed: Apr. 18, 2019

(65) Prior Publication Data

US 2020/0334923 A1     Oct. 22, 2020

(51) Int. Cl.
*G07C 5/00* (2006.01)
*G07C 5/08* (2006.01)
*B60Q 9/00* (2006.01)

(52) U.S. Cl.
CPC ............. *G07C 5/006* (2013.01); *B60Q 9/00* (2013.01); *G07C 5/0816* (2013.01)

(58) Field of Classification Search
CPC ........ G07C 5/006; G07C 5/0816; B60Q 9/00; B60N 2002/981
See application file for complete search history.

(56) References Cited

U.S. PATENT DOCUMENTS

| | | |
|---|---|---|
| 7,228,212 B2 | 6/2007 | Hijikata et al. |
| 7,551,068 B2 | 6/2009 | Powell et al. |
| 7,605,694 B2 | 10/2009 | Prost-Fin et al. |
| 7,675,432 B2 | 3/2010 | Leicht |
| 7,681,949 B2 | 3/2010 | Nathan et al. |
| 8,141,947 B2 | 3/2012 | Nathan et al. |
| 8,457,359 B2 | 6/2013 | Strauss et al. |
| 8,686,940 B2 | 4/2014 | Nathan et al. |
| 8,942,892 B2 | 1/2015 | Veen et al. |
| 9,517,777 B2 | 12/2016 | Hall et al. |
| 9,619,721 B2 | 4/2017 | Bogner et al. |
| 9,701,245 B2 | 7/2017 | Green et al. |
| 9,718,477 B2 | 8/2017 | Truong |
| 9,827,904 B2 | 11/2017 | Modarres et al. |
| 9,852,554 B2 | 12/2017 | Nix |
| 9,855,945 B2 | 1/2018 | Fung et al. |

(Continued)

FOREIGN PATENT DOCUMENTS

| | | |
|---|---|---|
| DE | 60223685 | 10/2008 |
| DE | 102018007365 | 1/2019 |

(Continued)

*Primary Examiner* — Marthe Y Marc-Coleman
(74) *Attorney, Agent, or Firm* — Rankin, Hill & Clark LLP

(57) ABSTRACT

A system and method for providing haptic alerts within a vehicle that include receiving vehicle data associated with at least one vehicle warning. The system and method also include determining a severity associated with the at least one vehicle warning and determining a duration associated with the at least one vehicle warning. The system and method further include determining at least one haptic alert that corresponds to the severity and duration of the at least one vehicle warning and controlling at least one vibrational actuator to provide the at least one haptic alert based on the determined severity and duration of the at least one vehicle warning.

20 Claims, 6 Drawing Sheets

(56) References Cited

U.S. PATENT DOCUMENTS

| | | | |
|---|---|---|---|
| 2004/0049323 A1 | 3/2004 | Tijerina et al. | |
| 2010/0295707 A1 | 11/2010 | Bennie et al. | |
| 2013/0341977 A1* | 12/2013 | Kiefer | B60N 2/986 |
| | | | 297/217.3 |
| 2015/0258934 A1* | 9/2015 | Basiri | B60Q 9/00 |
| | | | 188/1.11 E |
| 2017/0291544 A1* | 10/2017 | Ishihara | B60K 37/06 |
| 2017/0341578 A1 | 11/2017 | Sherony et al. | |
| 2018/0231975 A1 | 8/2018 | Sachdev et al. | |
| 2018/0237007 A1 | 8/2018 | Adam et al. | |
| 2018/0315316 A1 | 11/2018 | Ferrer et al. | |
| 2018/0334098 A1 | 11/2018 | Pouliquen | |
| 2019/0011916 A1 | 1/2019 | Rodriguez et al. | |

FOREIGN PATENT DOCUMENTS

| | | |
|---|---|---|
| EP | 1312499 | 5/2003 |
| EP | 1413500 | 1/2007 |
| EP | 2025553 | 3/2011 |
| KR | 20120044009 | 5/2012 |
| WO | 2014149657 | 9/2014 |

* cited by examiner

SYSTEM AND METHOD FOR PROVIDING HAPTIC ALERTS WITHIN A VEHICLE

BACKGROUND

Vehicles may utilize a plurality of systems capable of determining safety and mechanical related events that may occur within or around the vehicle. The plurality of systems may provide drivers with awareness or knowledge of safety and/or mechanical related events. In many cases, the systems are independently operated to individually present warnings to the driver of the vehicle through one or more lights on a dashboard, an interface warning, or an audio warning. In such cases, drivers may tend to ignore such basic visual or audio warnings as they may repeatedly occur within the vehicle and may be easily dismissed. Accordingly, the driver may not adequately react to such warnings resulting in lower likelihood that the vehicle may be operated in a safe manner.

BRIEF DESCRIPTION

According to one aspect, a computer-implemented method for providing alerts within a vehicle that includes receiving vehicle data associated with at least one vehicle warning. The computer-implemented method also includes determining a severity associated with the at least one vehicle warning and determining a duration associated with the at least one vehicle warning. The computer-implemented method further includes determining at least one haptic alert that corresponds to the severity and duration of the at least one vehicle warning and controlling at least one vibrational actuator to provide the at least one haptic alert based on the determined severity and duration of the at least one vehicle warning.

According to another aspect, a system for providing haptic alerts within a vehicle that includes a memory storing instructions when executed by a processor cause the processor to receive vehicle data associated with at least one vehicle warning. The instructions also cause the processor to determine a severity associated with the at least one vehicle warning and determine a duration associated with the at least one vehicle warning. The instructions further cause the processor to determine at least one haptic alert that corresponds to the severity and duration of the at least one vehicle warning and control at least one vibrational actuator to provide the at least one haptic alert based on the determined severity and duration of the at least one vehicle warning.

According to yet another aspect, a non-transitory computer readable storage medium storing instructions that when executed by a computer, which includes a processor perform a method that includes receiving vehicle data associated with at least one vehicle warning. The method also includes determining a severity associated with the at least one vehicle warning and determining a duration associated with the at least one vehicle warning. The method further includes determining at least one haptic alert that corresponds to the severity and duration of the at least one vehicle warning and controlling at least one vibrational actuator to provide the at least one haptic alert based on the determined severity and duration of the at least one vehicle warning.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
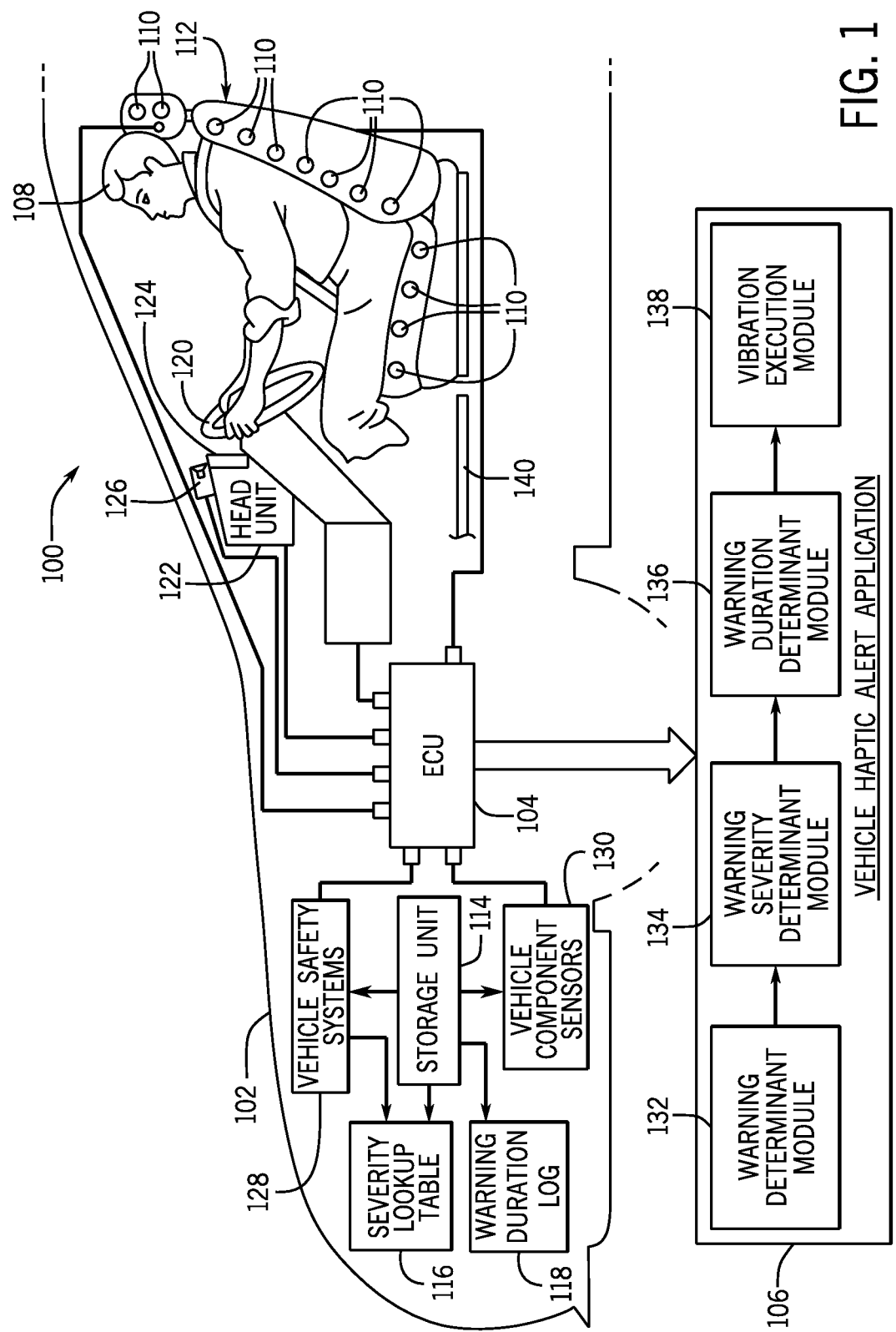
FIG. 1 is a schematic view of an operating environment for providing haptic alerts within a vehicle according to an exemplary embodiment of the present disclosure.

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database", as used herein can refer to table, a set of tables, and a set of data stores and/or methods for accessing and/or manipulating those data stores. Some databases can be incorporated with a disk as defined above.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers. In some embodiments, a "portable device" could refer to a remote device that includes a processor for computing and/or a communication interface for receiving and transmitting data remotely.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting the same, FIG. 1 is a schematic view of an operating environment 100 for providing haptic alerts within a vehicle 102 according to an exemplary embodiment of the present disclosure. The components of the environment 100, as well as the components of other systems, hardware architectures, and software architectures discussed herein, may be combined, omitted, or organized into different architectures for various embodiments.

Generally, the vehicle 102 includes an electronic control unit (ECU) 104 that executes or accesses a vehicle haptic alert application 106 (haptic alert application). In an exemplary embodiment, the haptic alert application 106 may communicate with the ECU 104 to retrieve data pertaining to one or more haptic alerts that may be provided to a driver 108 of the vehicle 102 and may be associated with the operation of the vehicle 102.

For purposes of simplicity, the exemplary embodiments of the environment 100 mainly apply to notifying the driver 108 of the vehicle 102 and providing one or more haptic alerts to the driver 108 seated within a seat 112 of the vehicle 102. However, it is to be appreciated that additional embodiments of the environment 100 may apply to notifying one or more non-driving occupants of the vehicle 102 that may be seated in respective passenger (non-driver) seats (not shown) of the vehicle 102. Accordingly, the embodiments discussed herein may apply to any type of occupant of the vehicle 102 who may be seated in any of the seats of the vehicle 102.

In an exemplary embodiment, one or more haptic alerts may be provided by the application 106 as one or more safety alerts that may pertain to driving safety warnings that may be provided to alert a driver 108 of the vehicle 102 of driving conditions or probable driving conditions that may be associated with safe operation of the vehicle 102. For example, one or more safety alerts may be provided as lane keep assist alerts, driver alertness alerts, vehicle distance alerts, park assist alerts, collision warning alerts, vehicle stability alerts, and the like based on one or more driving safety warnings that may pertain to the safe operation of the vehicle 102.

Additionally, the one or more haptic alerts may be provided as one or more maintenance alerts that may pertain to vehicle maintenance warnings. The vehicle maintenance warnings that may pertain to addressing maintenance and/or repair of mechanical components, electronic components, portions, and/or parts of the vehicle 102 that that may be associated with the safe operation of the vehicle 102. The one or more mechanical/electrical components may include, but may not be limited to an engine (not shown), a transmission (not shown), a braking system (not shown), tires(s), and/or other mechanical components, electronic components, portions, and/or parts of the vehicle 102 may be associated with the safe operation of the vehicle 102. The one or more vehicle maintenance alerts may be provided to alert the driver 108 of the vehicle 102 to replace engine oil, replace engine coolant, replace brake fluid, replace brake pads, and fill tire pressure, and the like based on one or more vehicle maintenance warnings that may pertain to the operation of the vehicle 102.

As discussed below, the haptic alert application 106 may be configured to receive vehicle data that may be analyzed to determine one or more driving safety warnings and/or one or more vehicle maintenance warnings. The application 106 may be configured to analyze the vehicle data and determine a severity of the one or more warnings. As discussed below, the severity may be associated with a degree of impact that a driving safety warning and/or a vehicle maintenance warning may have with respect to the safe operation of the vehicle 102. For example, a safety alert associated with the vehicle 102 that is mostly veering into a lane that includes an adjacent vehicle 102 may be determined to have a higher severity than if the vehicle 102 is slightly veering into the lane that does not include an adjacent vehicle.

The application 106 may also be configured to analyze the vehicle data and determine a duration of the one or more driving safety warnings and/or vehicle maintenance warnings. The duration of such warnings may be based on a timeframe that one or more driving safety warnings and/or one or more vehicle maintenance warnings may persist and are included within the vehicle data received by the application 106. Accordingly, if one or more causes (e.g., lane veering, engine oil replacement) of a driving safety warning(s) or a vehicle maintenance warning(s) are not rectified over a course of time and multiple safety alerts indicating the driving safety warning(s) and/or maintenance alerts indicating the vehicle maintenance warning(s) are provided to the driver 108 over a course of time, the duration of the one or more alerts may increase. For example, the duration of an oil change maintenance alert may increase if an oil change maintenance issue is not addressed by replacing the engine oil for a period of time (as the multiple corresponding maintenance alerts are provided to the driver 108).

The application 106 may be configured to thereby determine one or more respective haptic alerts to provide one or more safety alerts and/or one or more maintenance alerts. The haptic alerts provided by the haptic alert application 106 may be provided in a manner that corresponds to the severity of one or more warnings and/or the duration of one or more warnings. In particular, the haptic alert application 106 may determine one or more vibrational actuators 110 that may be enabled at a particular intensity, a particular frequency, and a particular duration to provide one or more respective haptic alerts to alert the driver 108 seated within the seat 112 of the driving safety warning(s) and/or the vehicle maintenance warning(s).

For purposes of simplicity, this disclosure will discuss the actuation of one or more respective haptic alerts using one or more vibrational actuators 110 within the seat 112. However, it is to be appreciated that the environment 100 may include additional vibrational actuators (not shown) in additional seats of the vehicle 102, and/or one or more additional portions of the vehicle 102, including, but not limited to a steering wheel 120, a floor board 140, a gear shifter (not shown), arm rests (not shown), and the like where the driver 108 or one or more non-driving occupants may sense one or more haptic alerts. The application 106 may be configured to enable one or more of the vibrational actuators 110 (and/or the additional vibrational actuators) to provide one or more respective haptic alerts using one or more vibrational intensities, one or more vibrational frequencies, and one or more vibrational durations based on the determined severity and duration of one or more warnings.

As discussed below, if one or more driving safety warnings and/or one or more vehicle maintenance warnings are determined to be increasing in severity based on an increasing degree of impact to the safe operation of the vehicle 102, the haptic alert application 106 may intensify the force of haptic feedback, the frequency of haptic feedback, and/or the duration of the haptic feedback to be provided by one or more of the vibrational actuators 110 to thereby provide the haptic alert to the driver 108 seated within the seat 112. Additionally, if one or more driving safety warnings and/or vehicle maintenance warnings are not addressed as the duration of the warning(s) progresses, the haptic alert application 106 may intensify the force of haptic feedback, the frequency of haptic feedback, and/or the duration of the haptic feedback to be provided by one or more of the vibrational actuators 110 to thereby provide the haptic alert to the driver 108 seated within the seat 112. This functionality may assist in ensuring that the driver 108 may not ignore the driving safety warning(s) and/or vehicle maintenance warning(s) and may address them as required.

Figure 2:
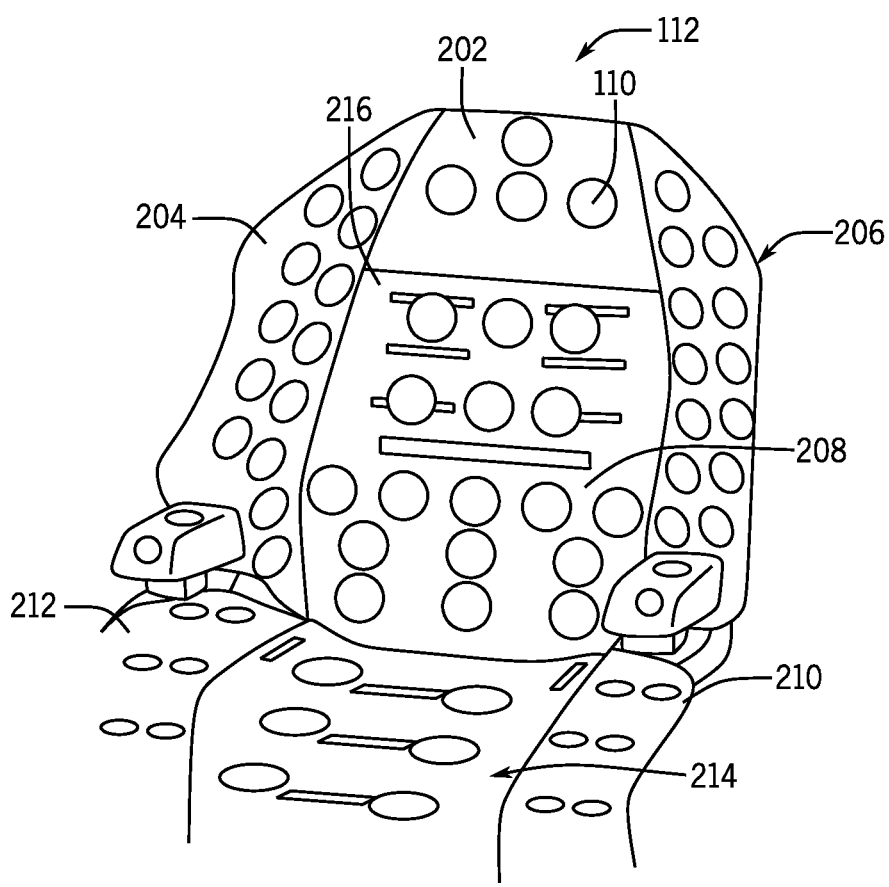
FIG. 2 is an illustrative view of vibrational actuators of the vehicle according to an exemplary embodiment of the present disclosure.

FIG. 2 is an illustrative view of vibrational actuators 110 of the vehicle 102 according to an exemplary embodiment of the present disclosure. In one embodiment, the vibrational actuators 110 may include respective motors (not shown) that each include a processing unit (not shown) that is operably connected to send and receive data to/from the ECU 104 and/or the haptic alert application 106. As discussed below, the ECU 104 and/or the haptic alert application 106 may send commands to one or more of the vibrational actuators 110 to be actuated to provide one or more haptic alerts to the driver 108 that corresponds to the severity and/or the duration of the one or more safety alerts and/or maintenance alerts.

In one or more configurations, the vibrational actuators 110 may include haptic devices that are configured as, but may not be limited to, eccentric rotating mass (ERM) elements, linear resonant actuators elements, air filled elements, liquid filled elements, and the like. In one embodiment, the vibrational actuators 110 may be utilized to provide haptic alerts to the driver 108 by providing various types of vibrations in various manners, various intensity levels, at various frequencies, and for various durations of time, as determined by the application 106.

As shown in the illustrative view of FIG. 2, the vibrational actuators 110 may be located (disposed) at one or more regions 202-216 of the seats 112 of the vehicle 102. As discussed, the vibrational actuators 110 may provide one or more haptic alerts at one or more of the regions 202-216 of the seat 112 based on the severity and duration of one or more safety alerts and/or one or more maintenance alerts. It is contemplated that the application 106 may utilize any number of regions in addition to or in lieu of the regions 202-216 that are provided at one or more portions of the seat 112 of the vehicle 102. Additionally, the vibrational actuators 110 may provide one or more haptic alerts at one or more of the regions 202-216 of the seat 112 based on one or more portions of the vehicle 102 that may be impacted by one or more driving safety warnings and/or one or more vehicle maintenance warnings.

With reference again to FIG. 1 and to the components of the vehicle 102, the ECU 104 may include internal processing memory (not shown), an interface circuit (not shown), and bus lines (not shown) for transferring data, sending commands, and communicating with components of the vehicle 102 and the haptic alert application 106. The ECU 104 may also include a communications device (not shown) for sending data internally in the vehicle 102 and externally to connected devices.

The communication device included within the ECU 104 may be capable of providing wired or wireless computer communications utilizing various protocols to send/receive electronic signals internally to/from components of the vehicle 102. Additionally, the communication device of the ECU 104 may be operably connected for internal computer communication via a bus (e.g., a Controller Area Network (CAN) or a Local Interconnect Network (LIN) protocol bus) to facilitate data input and output between the ECU 104 and the components of the vehicle 102.

In an exemplary embodiment, the ECU 104 may also be operably connected to a head unit 122. The head unit 122 may be configured to access one or more applications and operating systems that are executed by the ECU 104. In one embodiment, the head unit 122 may include a display unit 124 and an audio unit 126. The display unit 124 may be positioned to present one or more user interface alerts to the driver 108 seated within the seat 112 of the vehicle 102. In some configurations, the display unit 124 may include a touch screen display (not shown) that may receive touch based user inputs from the driver 108 that may apply to the one or more user interfaces that are presented via the display unit 124.

In one embodiment, the audio unit 126 may include one or more speakers (not shown) that may be configured to provide one or more audio alerts to the driver 108 seated within the seat 112 of the vehicle 102. The one or more audio alerts may be provided in a synchronized manner (e.g., same point in time) with one or more user interface alerts presented through the display unit 124. Alternatively, the one or more audio alerts may be provided independently of one or more user interface alerts.

In one or more embodiments, the haptic alert application 106 may provide one or more user interface alerts and/or one or more audio alerts as one or more haptic alerts are provided through one or more vibrational actuators 110 of the seat 112. Accordingly, the driver 108 may be presented with one or more user interface alerts that may display a particular type of alert (e.g., type of safety alert such as a lane keep assist alert, type of maintenance alert such as an oil replacement alert), a determined severity level of the alert (e.g., based on a 1-10 severity level scale), and/or a duration of the alert (e.g., number of times an alert has been provided, number of days a warning prompting the alert has been occurring) associated with one or more particular alerts.

In some embodiments, one or more user interfaces provided by the application 106 may include a respective haptic alert disablement user input that may be inputted by the driver 108 to disable one or more particular haptic alerts. For example, upon determining that a haptic alert is received based on the vibration of one or more vibrational actuators 110 of the seat 112, the driver 108 may input a respective haptic alert disablement user input to disable the current haptic alert to thereby stop the particular haptic alert and thereby to cease the vibration of one or more vibrational actuators 110 being utilized to provide the haptic alert.

In an exemplary embodiment, the ECU 104 may additionally be configured to utilize the display unit 124 and/or the audio unit 126 to provide one or more types of user interface alerts and/or audio alerts that may be directly presented to the driver 108 (separate from one or more haptic alerts provided by the application 106) based on one or more signals provided by vehicle safety systems 128 and/or vehicle component sensors 130 that may pertain to one or more vehicle operational issues. In one embodiment, the haptic alert application 106 may communicate with the head unit 122 to utilize the display unit 124 and/or the audio unit 126 to provide the user interface alerts and/or audio alerts during a predetermined number of instances of driving safety warnings and/or maintenance warnings that may be determined as having a low severity level and/or having been persistent for a short duration of time.

Accordingly, in some circumstances the application 106 may be configured to utilize the display unit 124 and/or the audio unit 126 (as a first step(s)) to provide certain low severity or short durational safety alerts and/or low severity or short durational maintenance alerts prior to utilizing one or more of the vibrational actuators 110 within the seat 112 to provide the safety alerts and/or maintenance alerts as haptic alerts. For example, a maintenance warning associated with changing an air filter that may be determined as having a low severity level may initially be provided through the display unit 124. However, if the maintenance warning associated with changing an air filter is ignored for a particular duration of time, the application 106 may utilize one or more of the vibrational actuators 110 within the seat 112 to also provide the maintenance warning in the form of the haptic alert(s).

On the other hand, a maintenance warning associated with extremely low tire pressure may be determined as having a high severity level and may be initially and directly provided using one or more of the vibrational actuators 110 within the seat 112 to provide the maintenance warning in the form of the haptic alert in addition to the utilization of the display unit 124. The haptic alert may thereby be increased with respect to the intensity of vibrational feedback, frequency of vibrational feedback, and duration of the vibrational feedback if the driver 108 does not rectify the vehicle maintenance warning (by adding air/repairing the tire). In other words, if the driver 108 continues to ignore the haptic alerts, they may intensify, may be provided more often, and/or may be provided for longer periods of time such that the driver 108 is prompted to rectify the issue causing the warnings associated with the haptic alerts.

In an exemplary embodiment, the ECU 104 may additionally be operably connected to a storage unit 114 that may store one or more operating systems, applications, associated operating system data, user interfaces, and the like that are executed by the ECU 104. In an exemplary embodiment, the storage unit 114 may store data (e.g., executable data files) that are associated with the haptic alert application 106 to be executed by the ECU 104.

In one embodiment, the storage unit 114 may be utilized by the application 106 to store a severity lookup table 116 that stores one or more predetermined severity level values that correspond to a baseline severity level (e.g., value) associated with one or more driving safety warnings and one or more vehicle maintenance warnings. The baseline severity level values may include a predetermined level of severity that may be accordingly correspond to particular types of driving safety warnings and/or vehicle maintenance warnings. As discussed below, the baseline severity level values may be analyzed and may be adjusted (increased) by the application 106 based on a particular degree of impact with respect to the safe operation of the vehicle 102 which is prompting the alert.

For example, the baseline severity level values may each correspond to particular types of driving safety warnings (e.g., lane keep assist warnings, vehicle stability warnings, close following vehicle warnings) and may be adjusted by the application 106 based on a degree of impact with respect to the safe operation of the vehicle 102. Also, the baseline severity level values may each correspond to particular types of maintenance warnings (e.g., oil replacement, brake fluid replacement, coolant replacement) and may be increased by the application 106 based on a degree of impact with respect to the safe operation of the vehicle 102.

As discussed below, as the severity of each warning is increased, the haptic alert application 106 may be configured to intensify one or more respective haptic alerts that are associated with the respective alert. The application 106 may additionally be configured to increase the frequency of one or more respective haptic alerts that are associated with the respective warning. Additionally, the application 106 may be configured to increase the duration of one or more respective haptic alerts that are associated with the respective warning. This functionality may provide a staggered and increasing notification to the driver 108 that may prompt the driver 108 (or additional occupants, or individuals) to address the driving safety warning(s) and/or the vehicle maintenance warning(s) which are prompting the haptic alert(s).

In an exemplary embodiment, the storage unit 114 may additionally include a warning duration log 118 that may be configured as a data store. In one configuration, the warning duration log 118 may include a plurality of data records that each respectively pertain to a particular safety warning and/or maintenance warning that may be provided to the driver 108. Each of the data records may be updated with data pertaining to a respective warning that may be determined by the haptic alert application 106. In particular, the haptic alert application 106 may be configured to update the warning duration log 118 with data pertaining to each driving safety warning and/or vehicle maintenance warning that may be determined by the application 106 from an initial instance that the alert is determined to an instance in which driving safety warning and/or the maintenance warning that prompts the respective alert is rectified.

In one configuration, the warning duration log 118 may be updated with a timestamp that is associated with each driving safety warning and/or vehicle maintenance warning that may indicate the first instance that the warning is determined. Additionally, the warning duration log 118 may be populated with additional timestamps that may indicate particular timeframes at which the user is notified (alerted) of the particular safety alert and/or maintenance alert. As discussed below, the haptic alert application 106 may be configured to access and analyze the warning duration log 118 with respect to each safety alert and/or maintenance alert to determine the duration of time that the respective safety alert and/or maintenance alert has been provided to the driver 108 of the vehicle 102.

As discussed, the duration of the driving safety warning and/or vehicle maintenance warning may be utilized by the application 106 to determine the intensity, frequency, and duration at which to provide one or more haptic alerts using one or more particular vibrational actuators 110 at one or more regions 202-214 of the seat 112. Accordingly, if the duration of the driving safety warning(s) and/or vehicle maintenance warning(s) increases based on an increasing number of notifications for the particular alert that may be provided to the driver 108, the haptic alert application 106 may be configured to increase the intensity, frequency, and/or duration of one or more respective haptic alerts that are associated with the respective alert. This functionality may provide a staggered and increasing notification to the driver 108 that may prompt the driver 108 (or additional occupants, or individuals) to address the driving safety warning(s) and/or the vehicle maintenance warning(s) which are prompting the alert(s).

As discussed in more detail below, the haptic alert application 106 may be configured to access and analyze the severity lookup table 116 and the warning duration log 118 at each instance that a particular driving safety warning and/or vehicle maintenance warning is determined based on vehicle data that is received by the application 106 from one or more vehicle safety systems 128 and/or one or more vehicle component sensors 130. Accordingly, the application 106 may provide haptic alerts through the enablement of one or more vibrational actuators 110 disposed at one or more regions 202-216 of the seat(s) 112 and at one or more timeframes to alert the driver 108 as to one or more particular driving safety warnings and/or one or more particular vehicle maintenance warnings that may need to be addressed.

In one or more embodiments, the vehicle safety systems 128 may include one or more systems that may be configured to provide vehicle data. The vehicle data provided by the vehicle safety systems 128 may pertain to one or more driving safety warnings and/or one or more commands (e.g., autonomous driving commands to the ECU 104) that are provided to counteract one or more predicted or on-going driving safety risks/issues that may be incurred during the operation of the vehicle 102. The vehicle safety systems 128 may include, but may not be limited to, a collision warning system, a collision mitigation braking system, a lane departure warning system, a blind spot indicator system, a lane keep assist system, a vehicle stability system, and the like that may be configured to provide vehicle data that includes one or more safety alerts to the ECU 104 and/or the haptic alert application 106.

In particular, the vehicle data provided by the vehicle safety systems 128 to the application 106 may include one or more driving safety warnings that may be provided to apply preventative measures during operation of the vehicle 102 to avoid unsafe operation of the vehicle 102. Such driving safety warnings may include, but may not be limited to, other vehicles following closer than a predetermined distance ahead, behind, or to the side of the vehicle 102, other vehicles located in the blind spot of the driver 108 of the vehicle 102, other vehicles that are approaching the vehicle 102 at a high rate of speed, objects that may come into the path of the vehicle 102 (e.g., construction cones, road debris), the vehicle 102 veering into an adjacent lane, hazardous road conditions (e.g., potholes), inclement weather conditions (e.g., icy roads), hazardous operation of the vehicle 102 within the surrounding environment (e.g., speeding near an intersection with a red traffic light) etc.

In an exemplary embodiment, upon receipt of the vehicle data by the application 106, the vehicle data may be analyzed to determine one or more driving safety warnings. The application 106 may thereby analyze the severity lookup table 116 to assign a baseline severity level value to each of the one or more driving safety warnings. The baseline severity level may thereby be adjusted (increased) by the application 106 based on further analysis of the one or more driving safety warnings with respect to the degree of impact associated with the safe operation of the vehicle 102 and/or the duration of the driving safety warning(s) which are prompting on-going driving safety warning(s). For example, when the vehicle 102 is driven in inclement weather, driving safety warnings associated with one or more hazardous vehicles approaching the vehicle 102 at a high rate of speed may be determined to pose a higher degree of impact to the safe operation of the vehicle 102. Accordingly, the application 106 may increase the baseline severity level associated with the safety warning(s) of a high speed vehicle approaching the vehicle 102 with a higher severity score based on the particular impact to the safe operation of the vehicle 102.

In some embodiments, the haptic alert application 106 may be configured to analyze the vehicle data provided by one or more of the vehicle safety systems 128 to determine one or more portions of the vehicle 102 that may be affected by one or more driving safety issues. For example, the haptic alert application 106 may determine one or more portions of the vehicle 102 including, but not limited to, a front left portion, a front center portion, a front right portion, a left side portion, a right side portion, and a rear left portion, a rear center portion, and a rear right portion, etc. that may be affected by one or more driving safety warnings as determined based on the vehicle data provided by one or more of the vehicle safety systems 128.

In one configuration, upon determining one or more portions of the vehicle 102 that may be affected by one or more driving safety issues, the application 106 may be configured to actuate one or more particular vibrational actuators 110 located at one or more regions 202-214 of the seat 112 that may correspond to the one or more portions of the vehicle 102 that may be affected by one or more driving safety warnings. Accordingly, the driver 108 may feel the haptic alert(s) at one or more regions of the seat that may indicate to the driver 108 a portion of the vehicle 102 that may be affected by the one or more driving safety warnings.

As an illustrative example, a right front side portion of the vehicle 102 may be specifically affected based on the vehicle 102 veering into an adjacent lane located to the right of the vehicle 102. Accordingly, (with reference to FIG. 2) the haptic alert application 106 may be configured to actuate one or more particular vibrational actuators 110 that are located at the region 212 located at a right front portion of the seat 112 to alert the driver 108 that the driving safety warning may apply to a right front side portion of the vehicle 102. Additionally, the application 106 may utilize the display unit 124 and/or the audio unit 126 to provide visual and audio warnings that may also indicate the one or more portions of the vehicle 102 that may be affected by one or more driving safety warnings.

In an exemplary embodiment, the vehicle component sensors 130 may be disposed near/at one or more mechanical components, one or more parts, and/or one or more portions of the vehicle 102 and may be configured to communicate vehicle data that may be analyzed to determine one or more vehicle maintenance warnings that may pertain to the operation of the vehicle 102. In one configuration, the vehicle component sensors 130 may include, but may not be limited to, tire pressure sensors, brake sensors, brake fluid sensors, engine oil sensors, engine temperature sensors, transmission sensors, engine coolant sensors, lighting sensors, battery sensors, and the like that may be configured to provide vehicle data that may be analyzed by the haptic alert application 106 to determine one or more vehicle maintenance warnings.

In one embodiment, upon receiving the vehicle data from the vehicle component sensors 130 and determining one or more vehicle mechanical warnings, the haptic alert application 106 may be configured to analyze the one or more vehicle maintenance warnings with respect to the severity lookup table 116 to assign a baseline severity level value to each of the one or more vehicle maintenance warnings. The baseline severity level value may thereby be adjusted by the application 106 based on further analysis of the vehicle maintenance warnings(s) with respect to the degree of impact to the safe operation of the vehicle 102 and/or the duration of the vehicle maintenance warnings(s) which are prompting on-going maintenance alert(s).

As an illustrative example, a substantial deterioration of a brake operation of the vehicle 102 based on one or more highly deteriorated brake pads may pose a higher degree of impact to the safe operation of the vehicle 102. Accordingly, the application 106 may increase the baseline severity level value associated with the vehicle maintenance warning of the brake pad deterioration with a higher severity level value based on the particular impact to the safe operation of the vehicle 102. Additionally, the application 106 may further increase the severity level value associated with the driving safety issue based on a length of duration of the vehicle maintenance warning that may be provided to the driver 108. For example, the severity level value associated with the safety alert may increase as the brake deterioration persists.

As additionally disclosed below, in some embodiments, the haptic alert application 106 may be configured to analyze the vehicle data provided by one or more of the vehicle component sensors 130 to determine one or more portions of the vehicle 102 that may be affected by one or more vehicle maintenance issues. In one configuration, upon determining one or more portions of the vehicle 102 that may be affected by one or more vehicle maintenance issues, the application 106 may be configured to actuate one or more particular vibrational actuators 110 located at one or more regions 202-216 of the seat 112 to provide the haptic alert at a particular location(s) of the seat 112 that may correspond to the one or more portions of the vehicle 102 that may be affected by one or more vehicle maintenance issues.

As an illustrative example, the application 106 may analyze the vehicle data and may determine a vehicle maintenance warning pertaining to a deterioration of a right rear brake pad of the vehicle 102. Accordingly, the application 106 may determine that a right rear portion of the vehicle 102 is affected by the vehicle maintenance warning. The application 106 may thereby actuate one or more particular vibrational actuators 110 located at the region 204 of the seat 112 that may be included at a right and rear portion of the seat 112 to provide the haptic alert(s) associated with the vehicle maintenance warning pertaining to a deterioration of the right rear brake pad occurring at the right rear portion of the vehicle 102. Additionally, the application 106 may utilize the display unit 124 and/or the audio unit 126 to provide visual and audio warnings that may also indicate the one or more portions of the vehicle 102 that may be affected by one or more vehicle maintenance warnings.

II. The Vehicle Haptic Alert Application and Related Methods

The vehicle haptic alert application 106 and its functionality will now be described in more detail according to an exemplary embodiment. In one embodiment, the haptic alert application 106 may be stored on the storage unit 114 and may be executed by the ECU 104 and/or the head unit 122. In additional embodiments, the haptic alert application 106 may be stored on a memory (not shown) of an external device (not shown) (e.g., remote server) and executed by the ECU 104 and/or the head unit 122 of the vehicle 102 via a computer communication medium (e.g., remote network connection) between the ECU 104 and the external device.

In one or more embodiments, the haptic alert application 106 may include a plurality of modules 132-136 that may include, but may not be limited to, a warning determinant module 132, a warning severity determinant module 134, a warning duration determinant module 136, and a vibration execution module 138. It is to be appreciated that the haptic alert application 106 may include additional modules and/or sub-modules of the plurality of modules 132-138.

In one embodiment, the haptic alert application 106 may be automatically enabled to operate upon a determination that the driver 108 is seated within the seat 112 based on the utilization of capacitive seat sensors (not shown) and/or upon actuation of an accessory or ignition mode of the vehicle 102. In an additional embodiment, the haptic alert application 106 may be manually enabled to operate based on an enablement of the application 106 through one or more interfaces associated with the application 106 that may be presented through the display unit 124.

In an exemplary embodiment, the warning determinant module 132 may be configured to communicate with the vehicle safety systems 128 to receive vehicle data from one or more of the vehicle safety systems 128. Upon the receipt of vehicle data from one or more of the vehicle safety systems 128, the warning determinant module 132 may be configured to analyze the vehicle data and determine one or more driving safety warnings that may be associated with the operation (e.g., driving) of the vehicle 102. The warning determine module 132 may additionally be configured to communicate with the vehicle component sensors 130 to receive vehicle data from one or more of the vehicle component sensors 130. Upon the receipt of vehicle data from one or more of the vehicle component sensors 130 the warning determinant module 132 may be configured to analyze the vehicle data and determine one or more vehicle maintenance warnings that may be associated with the operation (e.g., mechanical/operational components/parts) of the vehicle 102.

In one or more embodiments, the warning determinant module 132 may be configured to communicate data pertaining to the one or more driving safety warnings and/or one or more vehicle maintenance warnings as determined to the warning severity determinant module 134 and the warning duration determinant module 136. As discussed in more detail below, the warning severity determinant module 134 may be configured to determine respective baseline severity levels associated with the one or more driving safety warnings and/or one or more vehicle maintenance warnings based on analysis of the severity lookup table 116.

Upon determining respective baseline severity levels associated with the one or more driving safety warnings and/or one or more vehicle maintenance warnings, the warning severity determinant module 134 may be configured to further analyze the vehicle data communicated by the one or more of the vehicle safety systems 128 and/or the one or more of the vehicle component sensors 130 to determine a particular impact to the safe operation of the vehicle 102. The determination of the particular impact to the safe operation of the vehicle 102 may be utilized in some instances to increase the respective baseline severity level to a real-time severity level associated with the respective driving safety warning(s) and/or vehicle maintenance warning(s).

In some embodiments, the warning severity determinant module 134 may also be configured to analyze the vehicle data provided by one or more of the vehicle safety systems 128 to determine one or more portions of the vehicle 102 that may be affected by one or more driving safety issues. Upon determining of the real-time severity level and/or one or more portions of the vehicle 102 that may be affected by one or more driving safety issues, the warning severity determinant module 134 may be configured to communicate respective data to the vibration execution module 138 of the haptic alert application 106.

Additionally, as discussed in more detail below, the warning duration determinant module 136 may be configured to determine a respective duration of time that the one or more driving safety warnings and/or one or more vehicle maintenance warnings have been provided to the driver of the vehicle 102 based on the analysis of the warning duration log 118. Upon determining the respective duration of time that the one or more driving safety warnings and/or one or more vehicle maintenance warnings have been provided to the driver of the vehicle 102, the warning duration determinant module 136 may be configured to communicate a durational value associated with the duration of time to the vibration execution module 138 of the haptic alert application 106.

In one or more embodiments, the vibration execution module 138 may be configured to analyze the real-time severity value and the durational value and may determine an intensity level that includes a value pertaining to a vibrational feedback intensity as provided by the one or more vibrational actuators 110 (e.g., 1-10 value), a frequency level that includes a value pertaining to a frequency of providing haptic alerts during a predetermined period of time (e.g., 1-10), and a durational timeframe that includes a value of time that each haptic alert is to be provided (e.g., time based value). Upon determining the intensity level, the frequency level, and the durational timeframe, the vibration execution module 138 may be configured to operably control one or more of the vibrational actuators 110 to provide one or more haptic alerts to inform the driver of one or more safety alerts associated with one or more driving safety warnings and/or one or more maintenance alerts associated with one or more vehicle maintenance warnings.

In some configurations, the vibration execution module 138 may be configured to operably control one or more of the vibrational actuators 110 disposed at one or more particular regions 202-216 of the seat 112 based on one or more portions of the vehicle 102 that may be affected by one or more driving safety issues, as determined by the warning severity determinant module 134. As discussed, the modules 132-138 of the application 106 may continue to analyze vehicle data and control one or more of the vibrational actuators 110 to increase the intensity, frequency, and/or duration of one or more haptic alerts until one or more of the driving safety warnings and/or vehicle maintenance warnings are resolved.

Figure 3:
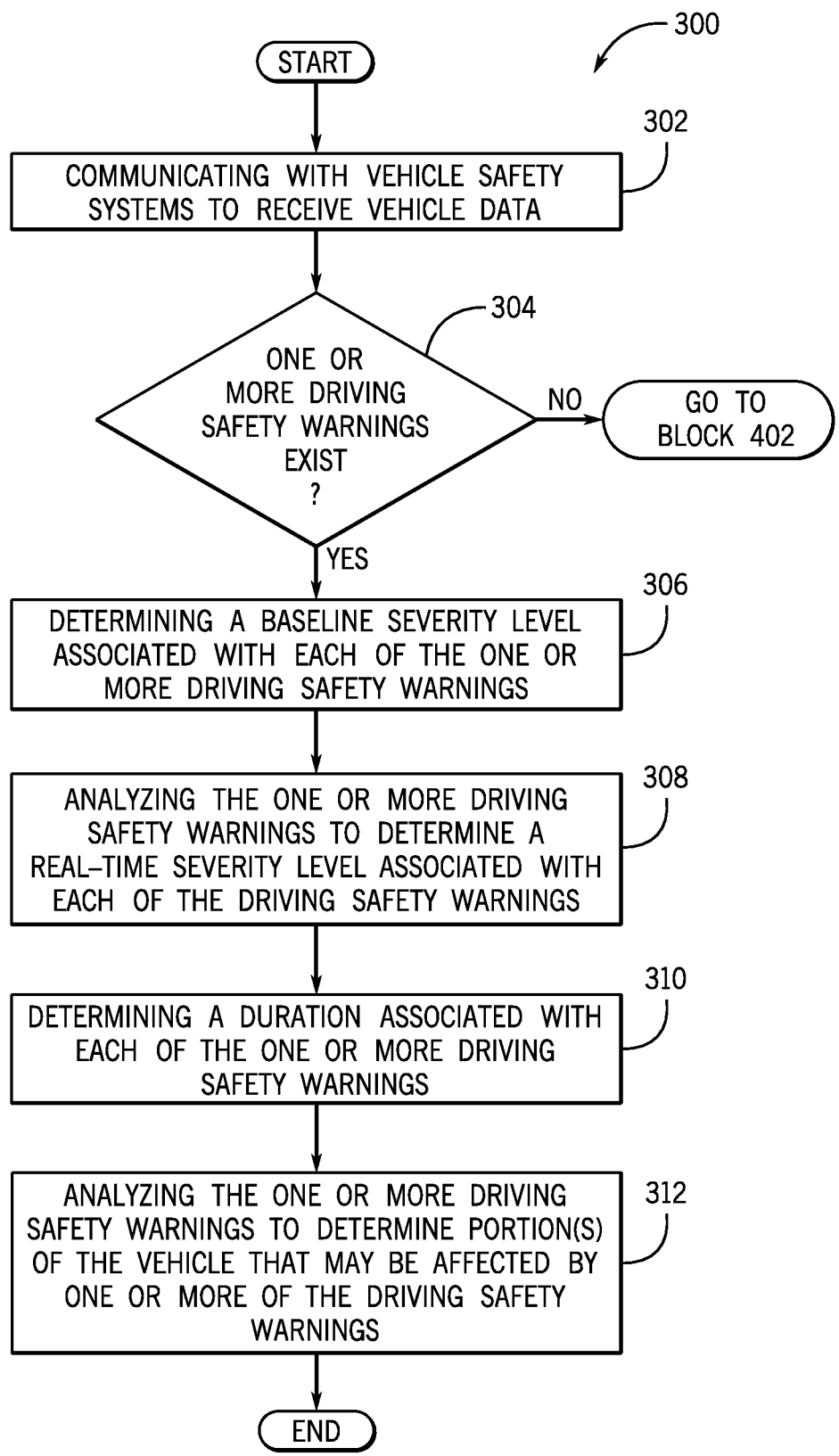
FIG. 3 is a process flow diagram of a method for determining a severity and duration associated with one or more driving safety warnings according to an exemplary embodiment of the present disclosure.

FIG. 3 is a process flow diagram of a method 300 for determining a severity and duration associated with one or more driving safety warnings according to an exemplary embodiment of the present disclosure. FIG. 3 will be described with reference to the components of FIG. 1 and FIG. 2, though it is to be appreciated that the method 3 of FIG. 3 may be used with additional and/or alternative system components. The method 300 may begin at block 302, wherein the method 300 may include communicating with vehicle safety systems 128 to receive vehicle data.

In an exemplary embodiment, the warning determinant module 132 of the haptic alert application 106 may be configured to communicate with the vehicle safety systems 128 to receive vehicle data. As discussed above, the vehicle safety systems 128 may communicate vehicle data that may pertain to one or more driving safety warnings and/or one or more commands (e.g., autonomous driving commands to the ECU 104) that are provided to counteract one or more predicted or on-going driving safety risks/issues that may be incurred during the operation of the vehicle 102.

The method 300 may proceed to block 304, wherein the method 300 may include determining if one or more safety warnings exist. In one embodiment, upon receiving the vehicle data from the vehicle safety systems 128, the warning determinant module 132 may be configured to analyze the vehicle data to determine if one or more of the vehicle safety systems 128 have included data that pertains to the one or more driving safety warnings that may pertain to one or more one or more predicted or on-going driving safety risks/issues that may be incurred during the operation of the vehicle 102.

If one or more driving safety warnings are not determined to exist based on the analysis of the vehicle data (at block 304), the warning determinant module 132 may execute block 402 of the method 400 (discussed below in much detail) to thereby receive vehicle data from the vehicle component sensors 130. Alternatively, if one or more driving safety warnings are determined to exist based on the analysis of the vehicle data by the warning determinant module 132, the method 300 may proceed to block 306, wherein the method 300 may include determining a baseline severity level associated with each of the one or more driving safety warnings.

In an exemplary embodiment, upon determining one or more driving safety warnings that exist based on analyzing the vehicle data communicated by the vehicle safety systems 128, the warning determinant module 132 may communicate data pertaining to the one or more driving safety warnings to the warning severity determinant module 134. In one or more embodiments, the warning severity determinant module 134 may be configured to access the storage unit 114 of the vehicle 102 and analyze the severity lookup table 116 stored on the storage unit 114. As discussed, the severity lookup table 116 may include one or more predetermined severity level values that correspond to a baseline severity level (e.g., value) associated with one or more driving safety warnings. The warning severity determinant module 134 may be configured to analyze the severity lookup table 116 to determine one or more baseline severity level values that each pertain to one or more driving safety warnings. The baseline severity level values may pertain to a baseline level of importance that should be conveyed with respect to each particular driving safety warning through one or more haptic alerts.

The method 300 may proceed to block 308, wherein the method 300 may include analyzing the one or more driving safety warnings to determine a real-time severity level associated with each of the one or more driving safety warnings. In an exemplary embodiment, the warning severity determinant module 134 may be configured to further analyze the one or more driving safety warnings to determine particular predicted or on-going driving safety risks/issues that correspond to each of the warnings. In particular, the warning severity determinant module 134 may determine a particular degree of impact with respect to the safe operation of the vehicle 102 which is prompting the alert. The particular degree of impact may be based on how much priority should be given to the driving safety warning(s) and/or how quickly the driving safety warnings should be addressed by the driver 108 to ensure safe operation of the vehicle 102.

In one or more embodiments, upon determining the particular degree of impact with respect to the safe operation of the vehicle 102, the warning severity determinant module 134 may thereby determine if the particular degree of impact warrants an increase of the severity level to thereby provide a more intense, a more frequent, and/or a longer durational haptic alert to the driver 108 to address the warning. In some configurations, the warning severity determinant module 134 may be configured to output the particular degree of impact as an impact level (e.g., value) and may compare the impact level against one or more severe level thresholds to determine if the particular degree of impact warrants an increase of the severity level.

The warning severity determinant module 134 may thereby determine a real-time severity level that may be equivalent to the baseline severity level if it is determined that the particular degree of impact does not increase the severity level. Alternatively, the warning severity determinant module 134 may thereby determine a real-time severity level that is greater than the baseline severity level by increasing the baseline severity level based on determining a particular degree of impact warrants an increase of the severity level to thereby provide a more intense, a more frequent, and/or a longer durational haptic alert to the driver 108.

The method 300 may proceed to block 310, wherein the method 300 may include determining a duration associated with each of the one or more driving safety warnings. In an exemplary embodiment, upon determining one or more driving safety warnings that exist based on analyzing the vehicle data communicated by the vehicle safety systems 128, the warning determinant module 132 may communicate data pertaining to the one or more driving safety warnings to the warning duration determinant module 136.

In one or more embodiments, the warning duration determinant module 136 may be configured to access the storage unit 114 of the vehicle 102 and analyze the warning duration log 118 stored on the storage unit 114. As discussed, the warning duration log 118 may be updated with a timestamp that is associated with each driving safety warning and/or vehicle maintenance warning that may indicate the first instance that the warning is determined. Additionally, the warning duration log 118 may be populated with additional timestamps that may indicate particular timeframes at which the user is notified (alerted) of the particular safety alert and/or maintenance alert.

In one embodiment, the warning duration determinant module 136 may query the warning duration log 118 to determine if the particular driving safety warning(s) has been previously recorded within the warning duration log 118. If it is determined that the particular driving safety warning(s) has not been previously recorded within the warning duration log 118, the warning duration log 118 may be updated with a timestamp that is associated with a first instance of the driving safety warning. The warning duration determinant module 136 may thereby determine the duration of the particular driving safety warning(s) based on the first instance of the warning. For example, based on determining that the driving safety warning(s) has not been previously recorded within the warning duration log 118, the warning duration determinant module 136 may determine that short duration associated with the driving safety warning(s).

Alternatively, the warning duration determinant module 136 may determine that the particular driving safety warning(s) has been previously recorded within the warning duration log 118 based on the driving safety warning(s) being communicated previously and the driver 108 being previously alerted of the driving safety warnings(s) through the display unit 124, audio unit 126, and/or haptic alert(s). If it is determined that the particular driving safety warning(s) has been previously recorded, the warning duration log 118 may be updated with a timestamp with the present instance of the driving safety warning(s). The warning duration determinant module 136 may thereby analyze the additional timestamps associated with the past instances of the driving safety warning(s) in addition to the timestamp of the present instance of the driving safety warning(s) to determine a duration (e.g., total timeframe) associated with each of the one or more driving safety warnings. The duration associated with each of the one or more driving safety warnings may indicate a timeframe that the driver 108 of the vehicle 102 may be alerted of the driving safety warning through the display unit 124, the audio unit 126, and/or one or more previous haptic alerts provided by one or more of the vibrational actuators 110.

The method 300 may proceed to block 312, wherein the method 300 may include analyzing the one or more driving safety warnings to determine portion(s) of the vehicle 102 that may be affected by one or more driving safety warnings. In some configurations, the warning severity determinant module 134 may be configured to additionally analyze the vehicle data associated with each of the one or more driving safety warnings to determine one or more portions of the vehicle 102 that may be affected by the one or more driving safety warnings. For example, the haptic alert application 106 may determine one or more portions of the vehicle 102 including, but not limited to, a front left portion, a front center portion, a front right portion, a left side portion, a right side portion, and a rear left portion, a rear center portion, and a rear right portion, etc. that may be affected by one or more driving safety warnings as determined based on the vehicle data provided by one or more of the vehicle safety systems 128.

In one embodiment, the warning severity determinant module 134 may be configured to communicate the real-time severity level associated with each driving safety warning to the vibration execution module 138 of the haptic alert application 106. Additionally, in some embodiments, the warning severity determinant module 134 may be configured to communicate the portion(s) of the vehicle 102 that may be determined to be affected by one or more of the driving safety warnings. Additionally, the warning duration determinant module 136 may be configured to communicate the determined duration associated with each of the one or more driving safety warnings to the vibration execution module 138. As discussed below, the vibration execution module 138 may be configured to analyze the real-time severity level(s), the duration(s), and/or the portion(s) of the vehicle 102 to thereby operably control one or more vibrational actuators 110 disposed in one or more respective regions 202-216 of the seat 112 in one or more manners to provide one or more haptic alerts.

Figure 4:
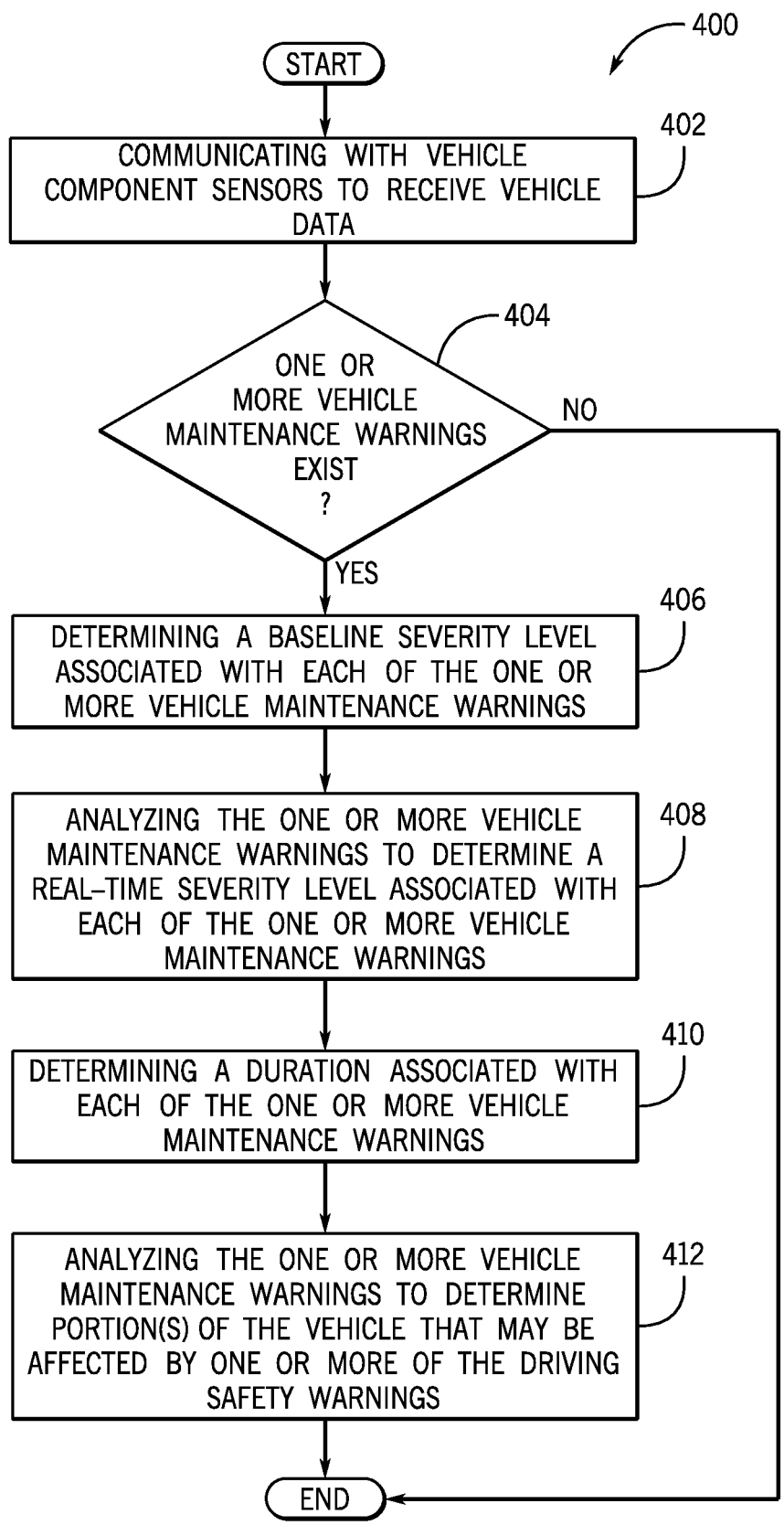
FIG. 4 is a process flow diagram of a method for determining a severity and duration associated with one or more vehicle maintenance warnings according to an exemplary embodiment of the present disclosure.

FIG. 4 is a process flow diagram of a method 400 for determining a severity and duration associated with one or more vehicle maintenance warnings according to an exemplary embodiment of the present disclosure. FIG. 4 will be described with reference to the components of FIG. 1 and FIG. 2, though it is to be appreciated that the method 400 of FIG. 4 may be used with additional and/or alternative system components. The method 400 may begin at block 402, wherein the method 400 may include communicating with vehicle component sensors 130 to receive vehicle data.

In an exemplary embodiment, the warning determinant module 132 of the haptic alert application 106 may be configured to communicate with the vehicle component sensors 130 to receive vehicle data. As discussed above, the vehicle component sensors 130 may communicate vehicle data that may pertain to one or more vehicle maintenance warnings that may be incurred during the operation of the vehicle 102.

The method 400 may proceed to block 404, wherein the method 400 may include determining if one or more vehicle maintenance warnings exist. In one embodiment, upon receiving the vehicle data from the vehicle component sensors 130, the warning determinant module 132 may be configured to analyze the vehicle data to determine if one or more of the vehicle component sensors 130 includes data that pertains to the one or more vehicle maintenance warnings that may pertain to one or more predicted or on-going vehicle maintenance/mechanical risks/issues that may be incurred during the operation of the vehicle 102.

If one or more vehicle maintenance warnings are determined to exist (at block 404), the method 400 may proceed to block 406, wherein the method 400 may include determining a baseline severity level associated with each of the one or more vehicle maintenance warnings. In an exemplary embodiment, upon determining one or more vehicle maintenance warnings that exist based on analyzing the vehicle data communicated by the vehicle component sensors 130, the warning determinant module 132 may communicate data pertaining to the one or more vehicle maintenance warnings to the warning severity determinant module 134.

In one or more embodiments, the warning severity determinant module 134 may be configured to access the storage unit 114 of the vehicle 102 and analyze the severity lookup table 116 stored on the storage unit 114. As discussed, the severity lookup table 116 may include one or more predetermined severity level values that correspond to a baseline severity level (e.g., value) associated with one or more vehicle maintenance warnings. The warning severity determinant module 134 may be configured to analyze the severity lookup table 116 to determine one or more baseline severity level values that pertain to each of the one or more vehicle maintenance warnings (determined at block 404). The baseline severity level values may pertain to a baseline level of importance that should be conveyed with respect to each particular vehicle maintenance warning through one or more haptic alerts.

The method 400 may proceed to block 408, wherein the method 400 may include analyzing the one or more vehicle maintenance warnings to determine a real-time severity level associated with each of the one or more vehicle maintenance warnings. In an exemplary embodiment, the warning severity determinant module 134 may be configured to further analyze the one or more vehicle maintenance warnings to determine particular predicted or on-going driving safety risks/issues that correspond to each of the warnings. In particular, the warning severity determinant module 134 may determine a particular degree of impact with respect to the safe operation of the vehicle 102 which is prompting the alert. The particular degree of impact may be based on how much priority should be given to the vehicle maintenance warning(s) and/or how quickly the vehicle maintenance warning(s) should be addressed by the driver 108 to ensure safe operation of the vehicle 102.

In one or more embodiments, upon determining the particular degree of impact with respect to the safe operation of the vehicle 102, the warning severity determinant module 134 may thereby determine if the particular degree of impact warrants an increase of the severity level to thereby provide a more intense, more frequent, and/or longer durational haptic alert to the driver 108 to address the warning. In some configurations, the warning severity determinant module 134 may be configured to output the particular degree of impact as an impact level (e.g., value) and may compare the impact level against one or more severe level thresholds to determine if the particular degree of impact warrants an increase of the severity level.

The warning severity determinant module 134 may thereby determine a real-time severity level that may be equivalent to the baseline severity level if it is determined that the particular degree of impact does not increase the severity level. Alternatively, the warning severity determinant module 134 may thereby determine a real-time severity level that is greater than the baseline severity level by increasing the baseline severity level based on determining a particular degree of impact warrants an increase of the severity level to thereby provide a more intense, more frequent, and/or longer durational haptic alert to the driver 108.

The method 400 may proceed to block 410, wherein the method 400 may include determining a duration associated with each of the one or more vehicle maintenance warnings. In an exemplary embodiment, upon determining one or more vehicle maintenance warnings that exist based on analyzing the vehicle data communicated by the vehicle safety systems 128, the warning determinant module 132 may communicate data pertaining to the one or more vehicle maintenance warnings to the warning duration determinant module 136. In one or more embodiments, the warning duration determinant module 136 may be configured to access the storage unit 114 of the vehicle 102 and analyze the warning duration log 118 stored on the storage unit 114. As discussed, the warning duration log 118 may be updated with a timestamp that is associated with each driving safety warning and/or vehicle maintenance warning that may indicate the first instance that the warning is determined. Additionally, the warning duration log 118 may be populated with additional timestamps that may indicate particular timeframes at which the user is notified (alerted) of the particular safety alert and/or maintenance alert.

In one embodiment, the warning duration determinant module 136 may query the warning duration log 118 to determine if the particular vehicle maintenance warning(s) has been previously recorded within the warning duration log 118. If it is determined that the particular driving safety warning(s) has not been previously recorded within the warning duration log 118, the warning duration log 118 may be updated with a timestamp that is associated with a first instance of the driving safety warning. The warning duration determinant module 136 may thereby determine the duration of the particular vehicle maintenance warning(s) based on the first instance of the warning. For example, based on determining that the vehicle maintenance warning(s) has not been previously recorded within the warning duration log 118, the warning duration determinant module 136 may determine a short duration associated with the vehicle maintenance warning(s).

Alternatively, the warning duration determinant module 136 may determine that the particular vehicle maintenance warning(s) has been previously recorded within the warning duration log 118 based on the vehicle maintenance warning(s) being communicated previously and the driver 108 being previously alerted of the vehicle maintenance warnings(s) through the display unit 124, audio unit 126, and/or haptic alert(s). If it is determined that the particular vehicle maintenance warning(s) has been previously recorded, the warning duration log 118 may be updated with a timestamp with the present instance of the vehicle maintenance warning(s).

The warning duration determinant module 136 may thereby analyze the additional timestamps associated with the past instances of the vehicle maintenance warning(s) in addition to the timestamp of the present instance of the vehicle maintenance warning(s) to determine a duration (e.g., total timeframe) associated with each of the one or more vehicle maintenance warnings. The duration associated with each of the one or more vehicle maintenance warnings may indicate a timeframe that the driver 108 of the vehicle 102 may be alerted of the vehicle maintenance warning through the display unit 124, the audio unit 126, and/or one or more previous haptic alerts provided by one or more of the vibrational actuators 110.

The method 400 may proceed to block 412, wherein the method 400 may include analyzing the one or more vehicle maintenance warnings to determine portion(s) of the vehicle 102 that may be affected by one or more vehicle maintenance warnings. In some configurations, the warning severity determinant module 134 may be configured to additionally analyze the vehicle data associated with each of the one or more vehicle maintenance warnings to determine one or more portions of the vehicle 102 that may be affected by the one or more vehicle maintenance warnings. For example, the haptic alert application 106 may determine one or more portions of the vehicle 102 including, but not limited to, a front left portion, a front center portion, a front right portion, a left side portion, a right side portion, and a rear left portion, a rear center portion, and a rear right portion, etc. that may be affected by one or more vehicle maintenance warnings as determined based on the vehicle data provided by one or more of the vehicle safety systems 128.

In one embodiment, the warning severity determinant module 134 may be configured to communicate the real-time severity level associated with each vehicle maintenance warning to the vibration execution module 138 of the haptic alert application 106. Additionally, in some embodiments, the warning severity determinant module 134 may be configured to communicate the portion(s) of the vehicle 102 that may be determined to be affected by one or more of the vehicle maintenance warnings. The warning duration determinant module 136 may also be configured to communicate the determined duration associated with each of the one or more vehicle maintenance warnings to the vibration execution module 138. As discussed below, the vibration execution module 138 may be configured to analyze the real-time severity level(s), the duration(s), and/or the portion(s) of the vehicle 102 to thereby operably control one or more vibrational actuators 110 disposed in one or more respective regions 202-216 of the seat 112 in one or more manners to provide one or more haptic alerts associated with the one or more vehicle maintenance warnings.

Figure 5:
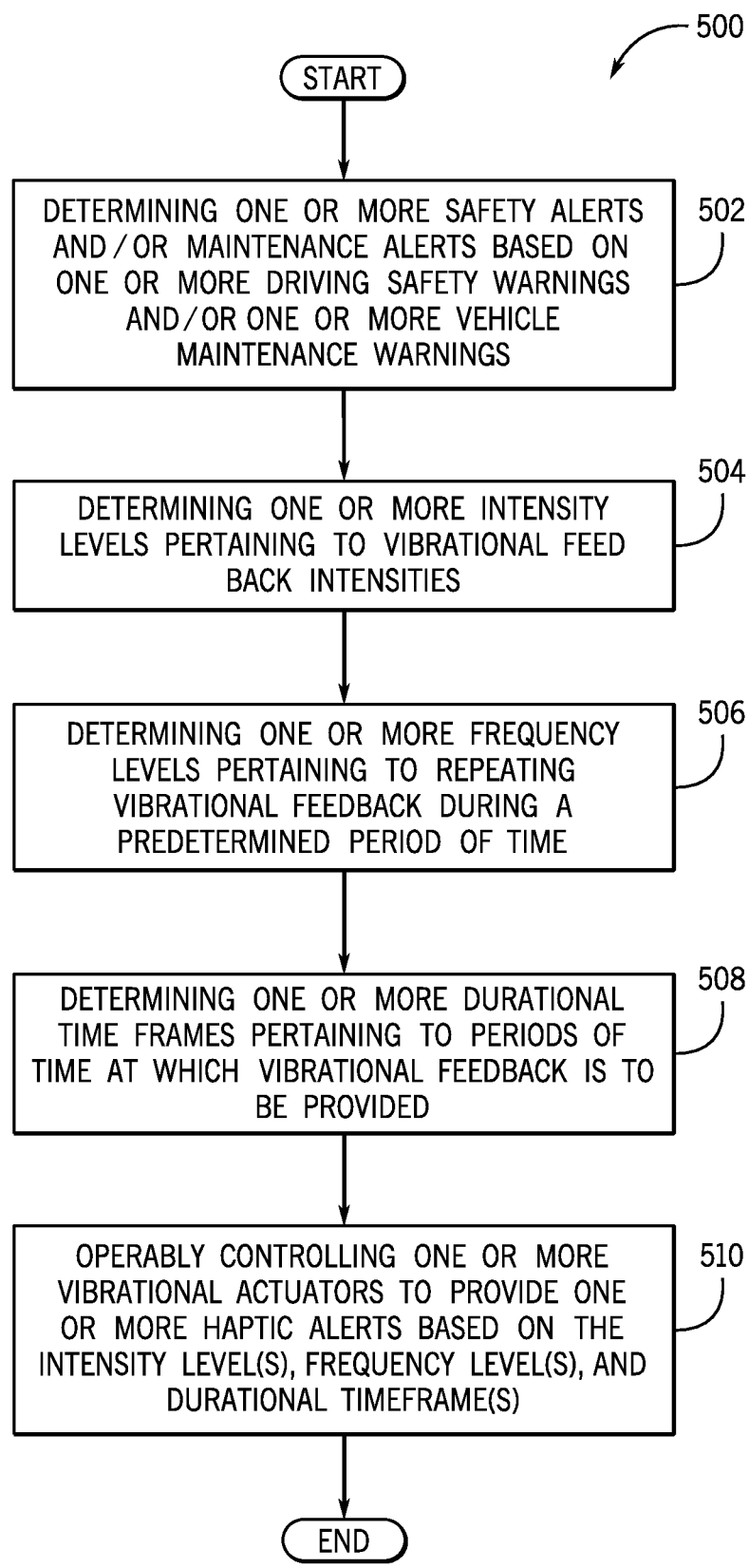
FIG. 5 is a process flow diagram of a method for providing one or more haptic alerts associated with one or more driving safety warnings and/or one or more vehicle maintenance warnings according to an exemplary embodiment of the present disclosure.

FIG. 5 is a process flow diagram of a method 500 for providing one or more haptic alerts associated with one or more driving safety warnings and/or one or more vehicle maintenance warnings according to an exemplary embodiment of the present disclosure. FIG. 5 will be described with reference to the components of of FIG. 1 and FIG. 2, though it is to be appreciated that the method 500 of FIG. 5 may be used with additional and/or alternative system components. The method 500 may begin at block 502, wherein the method 500 may include determining one or more driving safety alerts and/or vehicle maintenance alerts based on the one or more driving safety warnings and/or the one or more vehicle maintenance warnings.

In an exemplary embodiment, upon determining the severity of the one or more driving safety warnings and/or the one or more vehicle maintenance warnings, the warning severity determinant module 134 may communicate respective data to the vibration execution module 138 of the haptic alert application 106. Similarly, upon determining the duration of the one or more driving safety warnings and/or the one or more vehicle maintenance warnings, the warning duration determinant module 136 may communicate respective data to the vibration execution module 138.

In an exemplary embodiment, the vibration execution module 138 may analyze the severity and durational data as received and may determine one or more safety alerts that may be provided through one or more types of haptic feedback. The vibration execution module 138 may also analyze the severity and durational data as received and may determine one or more maintenance alerts that may be provided through one or more types of haptic feedback. Such haptic feedback may be provided by various types of vibrational feedback that may include, but may not be limited to, pulsing vibrations, slight nudging vibrations, whole body vibrations, hand-arm vibrations, and the like.

The method 500 may proceed to block 504, wherein the method 500 may include determining one or more intensity levels pertaining to vibrational feedback intensities. In one or more embodiments, the vibration execution module 138 may be configured to analyze the real-time severity value and the durational value of each driving safety warning and/or each vehicle maintenance warning and may determine an intensity level that includes a value pertaining to a vibrational feedback intensity as provided by the one or more vibrational actuators 110 (e.g., 1-10 value), Accordingly, the vibration execution module 138 may be configured to increase the intensity level if the driver 108 does not rectify the driving safety warning and/or the vehicle maintenance warning (as the methods 300, 400, and 500 may be re-executed by the application 106). For example, if the severity and/or duration of a particular vehicle maintenance warning is low, the vibration execution module 138 may be configured to output a low intensity level to thereby provide each haptic alert at with a low intensity vibrational feedback to be sensed by the driver 108. However, as the severity and/or duration of the particular vehicle maintenance warning increases, the vibration execution module 138 may be configured to output a higher intensity level to thereby provide each haptic alert with a greater vibrational feedback intensity through the vibrational actuators 110 to be sensed by the driver 108.

The method 500 may proceed to block 506, wherein the method 500 may include determining one or more frequency levels pertaining to repeating vibrational feedback during a predetermined period of time. In one or more embodiments, the vibration execution module 138 may be configured to analyze the real-time severity value and the durational value of each driving safety warning and/or each vehicle maintenance warning and may determine a frequency level (e.g., 1-10 value) that includes a value pertaining to a frequency of providing haptic alerts through the one or more vibrational actuators 110 during a predetermined period of time.

Accordingly, the vibration execution module 138 may be configured to increase the frequency level if the driver 108 does not rectify the driving safety warning and/or the vehicle maintenance warning (as the methods 300, 400, and 500 may be re-executed by the application 106). For example, if the severity and/or duration of a particular vehicle maintenance warning is low, the vibration execution module 138 may be configured to output a low frequency level to provide the haptic alert to be repeated less frequently. However, as the severity and/or duration of the particular vehicle maintenance warning increases, the vibration execution module 138 may be configured to output a higher frequency level to provide vibrational feedback at a greater frequency to thereby provide the haptic alert to be repeated more frequently (e.g., more often during the predetermined period of time) through the vibrational actuators 110.

The method 500 may proceed to block 508, wherein the method 500 may include determining one or more durational timeframes pertaining to periods of time at which vibrational feedback is to be provided. In one or more embodiments, the vibration execution module 138 may be configured to analyze the real-time severity value and the durational value of each driving safety warning and/or each vehicle maintenance warning and may determine durational timeframe that includes a value of time that each haptic alert is to be provided (e.g., time based value).

Accordingly, the vibration execution module 138 may be configured to increase the durational value if the driver 108 does not rectify the driving safety warning and/or the vehicle maintenance warning (as the methods 300, 400, and 500 may be re-executed by the application 106). For example, if the severity and/or duration of a particular vehicle maintenance warning is low, the vibration execution module 138 may be configured to output a low durational value to provide each haptic feedback for a short duration of time. However, as the severity and/or duration of the particular vehicle maintenance warning increases, the vibration execution module 138 may be configured to output a higher durational value to thereby provide each haptic feedback for a longer duration of time (e.g., provide the haptic feedback for a longer period of time) through the vibrational actuators 110.

The method 500 may proceed to block 510, wherein the method 500 may include operably controlling one or more vibrational actuators 110 to provide one or more haptic alerts based on the intensity level(s), frequency level(s), and durational timeframe(s). In an exemplary embodiment, the vibration execution module 138 may be configured to communicate with the ECU 104 to send one or more commands to the ECU 104 that pertain to the intensity level(s), frequency level(s), and durational timeframe(s) determined by the vibration execution module 138. The ECU 104 may accordingly determine the intensity level(s), frequency level(s), and durational timeframe(s) at which one or more of the vibrational actuators 110 are to be actuated to provide the one or more haptic alerts to the driver 108 to alert the driver 108 of the one or more driving safety warnings and/or one or more driving safety warnings.

In one or more embodiments, the ECU 104 may operably control one or more of the vibrational actuators 110 to be actuated to provide haptic vibratory feedback to provide the haptic alert(s) to the driver 108 to alert the driver of the driving safety warning(s) and/or the vehicle maintenance warning(s). The haptic vibratory feedback may accordingly be provided in a particular intensity, repeatedly provided at a particular frequency, and provided for a particular duration of time based on the respective intensity level(s), frequency level(s), and durational timeframe(s) as determined by the vibration execution module 138. In other words, one or more of the vibrational actuators 110 may be actuated in a manner to vibrate at a particular level of intensity based on the determined respective intensity level(s). The one or more vibrational actuators 110 may also be actuated in a manner to repeatedly vibrate at a particular frequency based on the determined respective frequency level(s). Additionally, the one or more vibrational actuators 110 may be actuated (at each instance) in a manner to vibrate for a particular duration of time based on the determined respective durational timeframe(s).

In some embodiments, the vibration execution module 138 may be configured to analyze the one or more portions of the vehicle 102 that may be affected by one or more driving safety issues (as determined at block 312) as communicated by the warning severity determinant module 134 and/or one or more portions of the vehicle 102 that may be affected by one or more vehicle maintenance issues (as determined at block 412) as communicated by the warning duration determinant module 136.

In one configuration, upon determining one or more portions of the vehicle 102 that may be affected, the application 106 may be configured to actuate one or more particular vibrational actuators 110 located at one or more regions 202-214 of the seat 112 that may correspond to the one or more portions of the vehicle 102 that may be affected by one or more driving safety warnings. Accordingly, the driver 108 may feel the haptic alert(s) at one or more regions of the seat that may indicate to the driver 108 a portion of the vehicle 102 that may be affected by the one or more driving safety warnings.

In some circumstances, the haptic alert application 106 may be configured to utilize the display unit 124 and/or the audio unit 126 to initially provide certain low severity or short durational driving safety alerts and/or low severity or short durational vehicle maintenance alerts prior to utilizing one or more of the vibrational actuators 110 within the seat 112 to provide the driving safety alerts and/or vehicle maintenance alerts as haptic alerts.

In some embodiments, the haptic alert application 106 may be configured to communicate with the ECU 104 to operably control one or more vibrational actuators disposed in one or more non-driver seats of the vehicle 102 if the determined severity and duration of the driving safety warning(s) and/or the vehicle maintenance warning(s) are determined to both be above a predetermined high threshold. In such cases, the severity and the duration of the driving safety warning(s) and/or the vehicle maintenance warning(s) may indicate that one or more severe warnings have not been addressed for a long duration of time.

The one or more vibrational actuators disposed in one or more non-driver seats of the vehicle 102 may thereby be actuated in one or more manners to thereby prompt one or more non-driving occupants of the vehicle 102 to remedy the warning(s) or to remind the driver 108 to remedy the warning(s). In some configurations one or more vibrational actuators 110 disposed in the seat 112 and the one or more vibrational actuators 110 disposed within the one or more non-driver seats of the vehicle 102 may be actuated to provide a particular intensity of vibratory feedback at a frequency and for a particular duration of time based on the determined severity and duration of the driving safety warning(s) and/or the vehicle maintenance warning(s).

Figure 6:
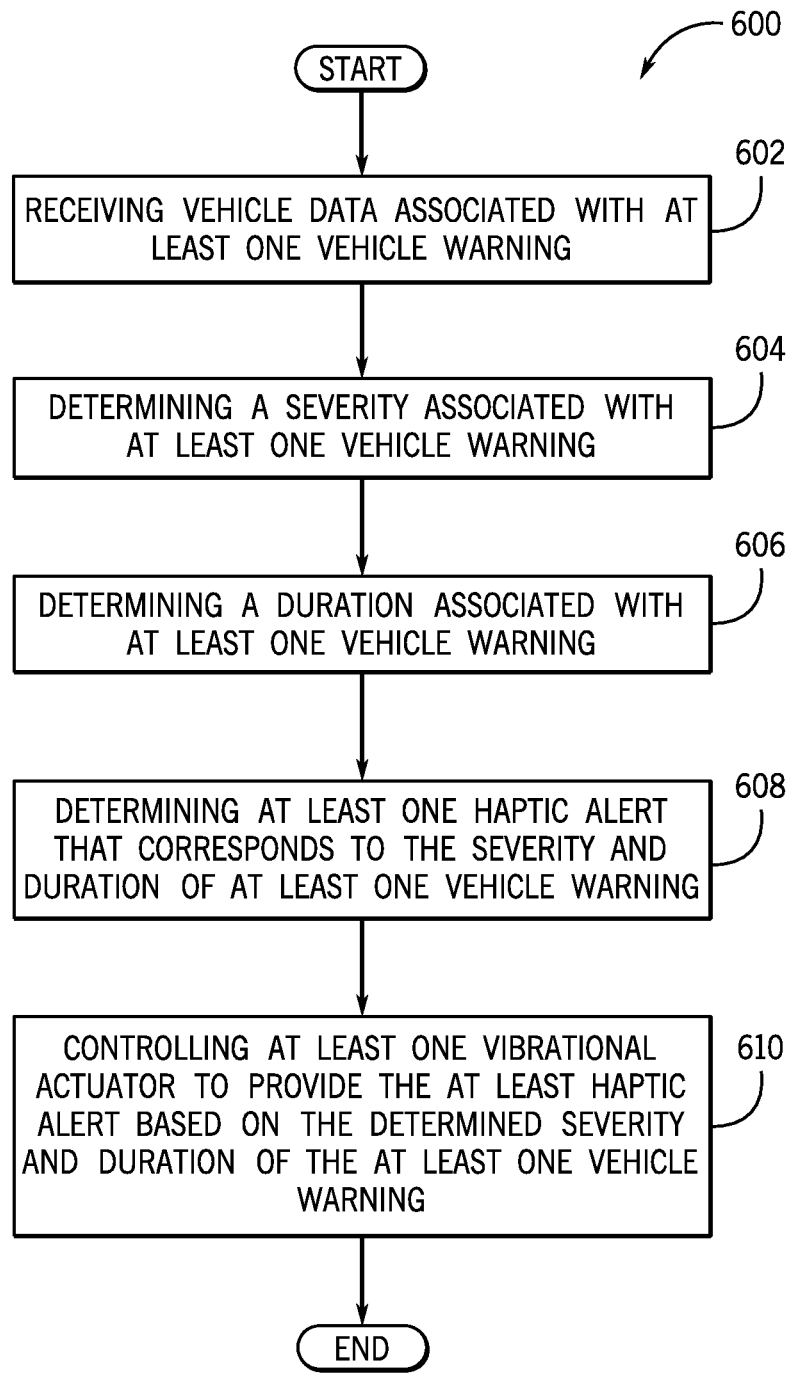
FIG. 6 is a process flow diagram of a method for providing haptic alerts within a vehicle according to an exemplary embodiment of the present disclosure.

FIG. 6 is a process flow diagram of a method 600 for providing haptic alerts within a vehicle 102 according to an exemplary embodiment of the present disclosure. FIG. 6 will be described with reference to the components of FIG. 1 and FIG. 2, though it is to be appreciated that the method 500 of FIG. 6 may be used with additional and/or alternative system components. The method 600 may begin at block 602, wherein the method 600 may include receiving vehicle data associated with at least one vehicle warning.

The method 600 may proceed to block 604, wherein the method 600 may include determining a severity associated with the at least one vehicle warning. The method 600 may proceed to block 606, wherein the method 600 may include determining a duration associated with the at least one vehicle warning.

The method 600 may proceed to block 608, wherein the method 600 may include determining at least one haptic alert that corresponds to the severity and duration of the at least one vehicle warning. The method 600 may proceed to block 610, wherein the method 600 may include controlling at least one vibrational actuator 110 to provide the at least haptic alert based on the determined severity and duration of the at least one vehicle warning.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for providing haptic alerts within a vehicle, comprising:
receiving vehicle data associated with at least one vehicle warning;
determining a baseline severity level associated with the at least one vehicle warning, wherein a particular degree of impact with respect to a safe operation of the vehicle is output as an impact level and the impact level is analyzed against at least one threshold value to determine an adjustment from baseline severity level to a real-time severity level;

determining a duration associated with the at least one vehicle warning;

determining at least one haptic alert that corresponds to the real-time severity level and duration of the at least one vehicle warning; and controlling at least one vibrational actuator to provide the at least one haptic alert based on the real-time severity level and duration of the at least one vehicle warning.

2. The computer-implemented method of claim 1, wherein the at least one vehicle warning includes at least: a driving safety warning that pertains to driving conditions or probable driving conditions that are associated with a safe operation of the vehicle and a vehicle maintenance warning that pertains to maintenance or repair of mechanical components, electronic components, portions, or parts of the vehicle.

3. The computer-implemented method of claim 1, wherein the baseline severity level associated with the at least one vehicle warning is determined based on querying of a severity lookup table that is stored upon a storage unit, wherein the baseline severity level corresponds to a particular type of driving safety warning or particular type of vehicle maintenance warning.

4. The computer-implemented method of claim 3, wherein the at least one vehicle warning is analyzed and the baseline severity level is adjusted to the real-time severity level based on a duration of at least one vehicle maintenance warning.

5. The computer-implemented method of claim 4, further including updating a warning duration log with at least one timeframe at which the at least one vehicle warning is provided, wherein determining the duration associated with the at least one vehicle warning includes determining the at least one timeframe that the at least one vehicle warning persists based on an analysis of the warning duration log.

6. The computer-implemented method of claim 1, wherein determining the at least one haptic alert includes determining at least one intensity level associated with the severity and duration of the at least one vehicle warning, wherein the at least one intensity level pertains to a level of intensity of vibratory feedback of the at least one haptic alert.

7. The computer-implemented method of claim 6, wherein determining the at least one haptic alert includes determining at least one frequency level associated with the severity and duration of the at least one vehicle warning, wherein the at least one frequency level pertains to a frequency of vibratory feedback of the at least one haptic alert.

8. The computer-implemented method of claim 7, wherein determining the at least one haptic alert includes determining at least one durational timeframe associated with the severity and duration of the at least one vehicle warning, wherein the at least one durational timeframe pertains to a duration of time of vibratory feedback of the at least one haptic alert.

9. The computer-implemented method of claim 8, wherein controlling the at least one vibrational actuator includes controlling at least one vibrational actuator to provide the at least one vibratory feedback based on the at least one intensity level, the at least one frequency level, and the at least one duration of time of vibratory feedback.

10. A system for providing haptic alerts within a vehicle, comprising:
a memory storing instructions when executed by a processor cause the processor to:
receive vehicle data associated with at least one vehicle warning;
determine a baseline severity level associated with the at least one vehicle warning, wherein a particular degree of impact with respect to a safe operation of the vehicle is output as an impact level and the impact level is analyzed against at least one threshold value to determine an adjustment from baseline severity level to a real-time severity level;
determine a duration associated with the at least one vehicle warning;
determine at least one haptic alert that corresponds to the real-time severity level and duration of the at least one vehicle warning; and
control at least one vibrational actuator to provide the at least one haptic alert based on the real-time severity level and duration of the at least one vehicle warning.

11. The system of claim 10, wherein the at least one vehicle warning includes at least: a driving safety warning that pertains to driving conditions or probable driving conditions that are associated with safe operation of the vehicle and a vehicle maintenance warning that pertains to maintenance or repair of mechanical components, electronic components, portions, or parts of the vehicle.

12. The system of claim 10, wherein the baseline severity level associated with the at least one vehicle warning is determined based on querying of a severity lookup table that is stored upon a storage unit, wherein the baseline severity level corresponds to a particular type of driving safety warning or particular type of vehicle maintenance warning.

13. The system of claim 12, wherein the at least one vehicle warning is analyzed and the baseline severity level is adjusted to the real-time severity level based on a duration of at least one vehicle maintenance warning.

14. The system of claim 13, further including updating a warning duration log with at least one timeframe at which the at least one vehicle warning is provided, wherein determining the duration associated with the at least one vehicle warning includes determining the at least one timeframe that the at least one vehicle warning persists based on an analysis of the warning duration log.

15. The system of claim 10, wherein determining at least one haptic alert includes determining at least one intensity level associated with the severity and duration of the at least one vehicle warning, wherein the at least one intensity level pertains to a level of intensity of vibratory feedback of the at least one haptic alert.

16. The system of claim 15, wherein determining at least one haptic alert includes determining at least one frequency level associated with the severity and duration of the at least one vehicle warning, wherein the at least one frequency level pertains to a frequency of vibratory feedback of the at least one haptic alert.

17. The system of claim 16, wherein determining at least one haptic alert includes determining at least one durational timeframe associated with the severity and duration of the at least one vehicle warning, wherein the at least one durational timeframe pertains to a duration of time of vibratory feedback of the at least one haptic alert.

18. The system of claim 17, wherein controlling the at least one vibrational actuator includes controlling at least one vibrational actuator to provide the at least one vibratory feedback based on the at least one intensity level, the at least one frequency level, and the at least one duration of time of vibratory feedback.

19. A non-transitory computer readable storage medium storing instructions that when executed by a computer, which includes a processor perform a method, the method comprising:
- receiving vehicle data associated with at least one vehicle warning;
- determining a baseline severity level associated with the at least one vehicle warning, wherein a particular degree of impact with respect to a safe operation of the vehicle is output as an impact level and the impact level is analyzed against at least one threshold value to determine an adjustment from baseline severity level to a real-time severity level;
- determining a duration associated with the at least one vehicle warning;
- determining at least one haptic alert that corresponds to the real-time severity level and duration of the at least one vehicle warning; and
- controlling at least one vibrational actuator to provide the at least one haptic alert based on the determined real-time severity level and duration of the at least one vehicle warning.

20. The non-transitory computer readable storage medium of claim 19, wherein the at least one vehicle warning includes at least: a driving safety warning that pertains to driving conditions or probable driving conditions that are associated with a safe operation of the vehicle and a vehicle maintenance warning that pertains to maintenance or repair of mechanical components, electronic components, portions, or parts of the vehicle.

* * * * *